Jan. 12, 1943.　　　　J. B. SLEVIN, JR　　　　2,308,394
MACHINE FOR MAKING CONTAINER CARRIERS
Filed Sept. 3, 1941　　　　5 Sheets-Sheet 1
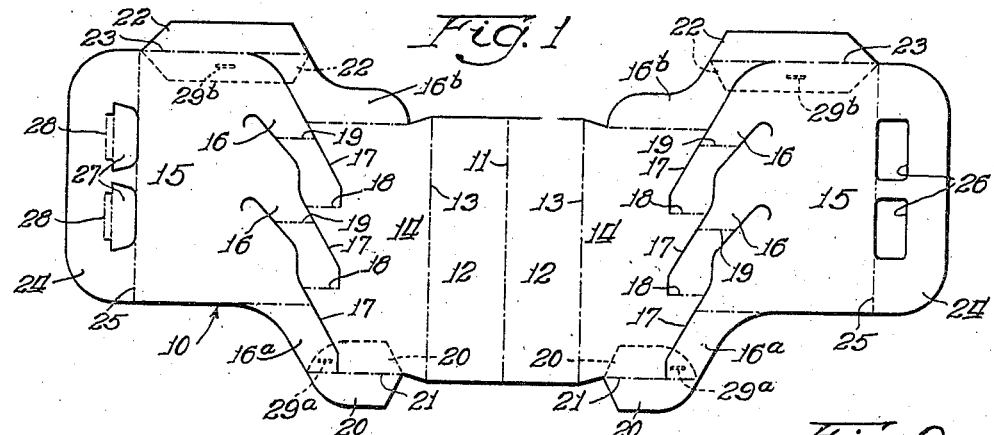
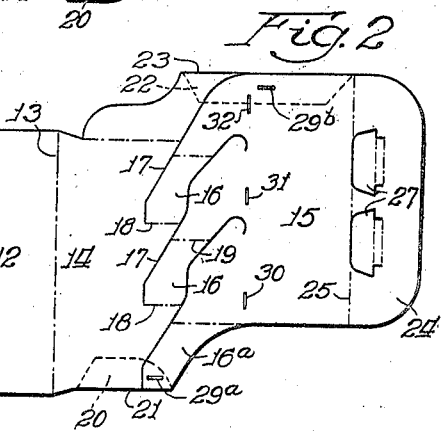
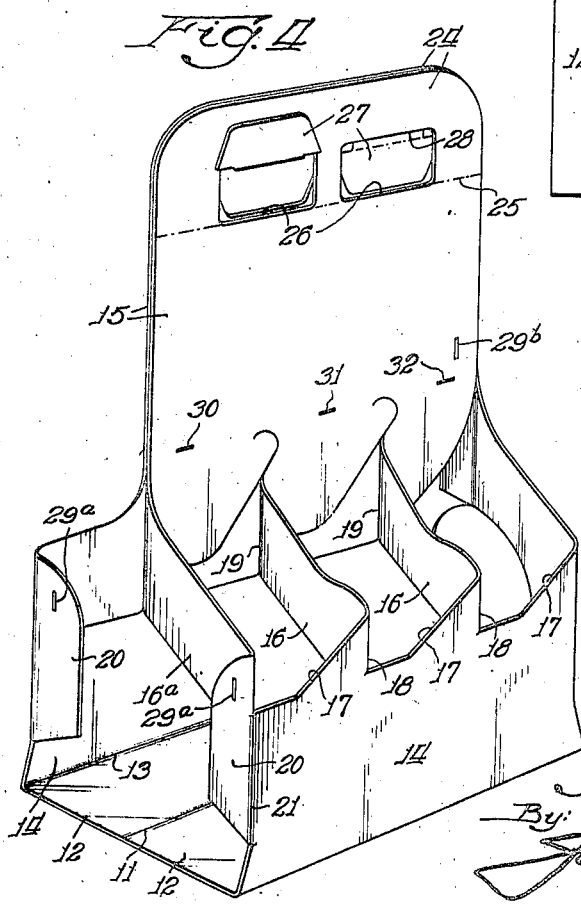
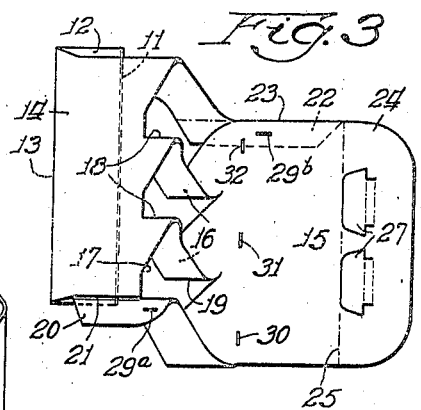
Inventor:
Julian B. Slevin, Jr.
By
Jas. C. Hobensmith
Atty.

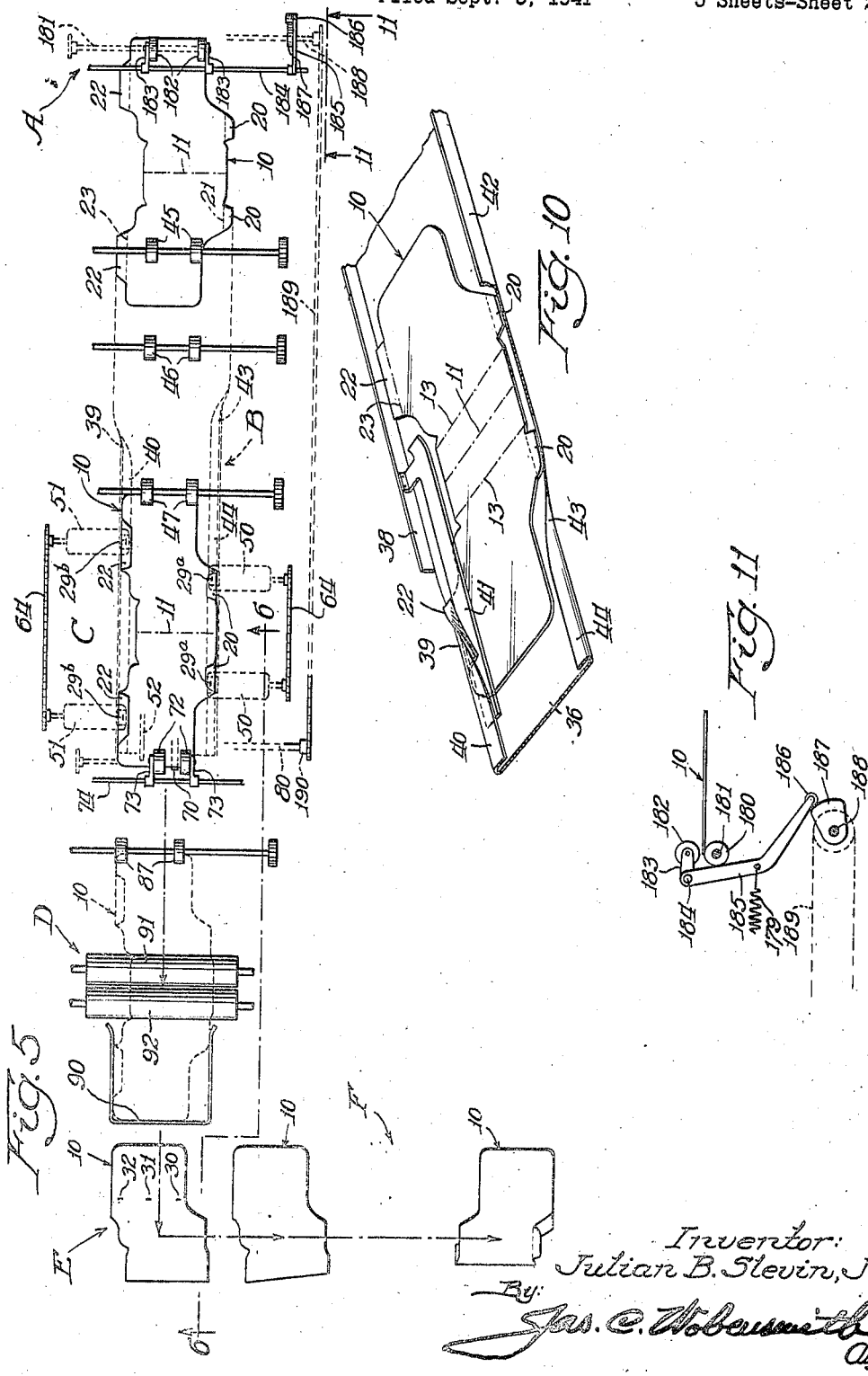

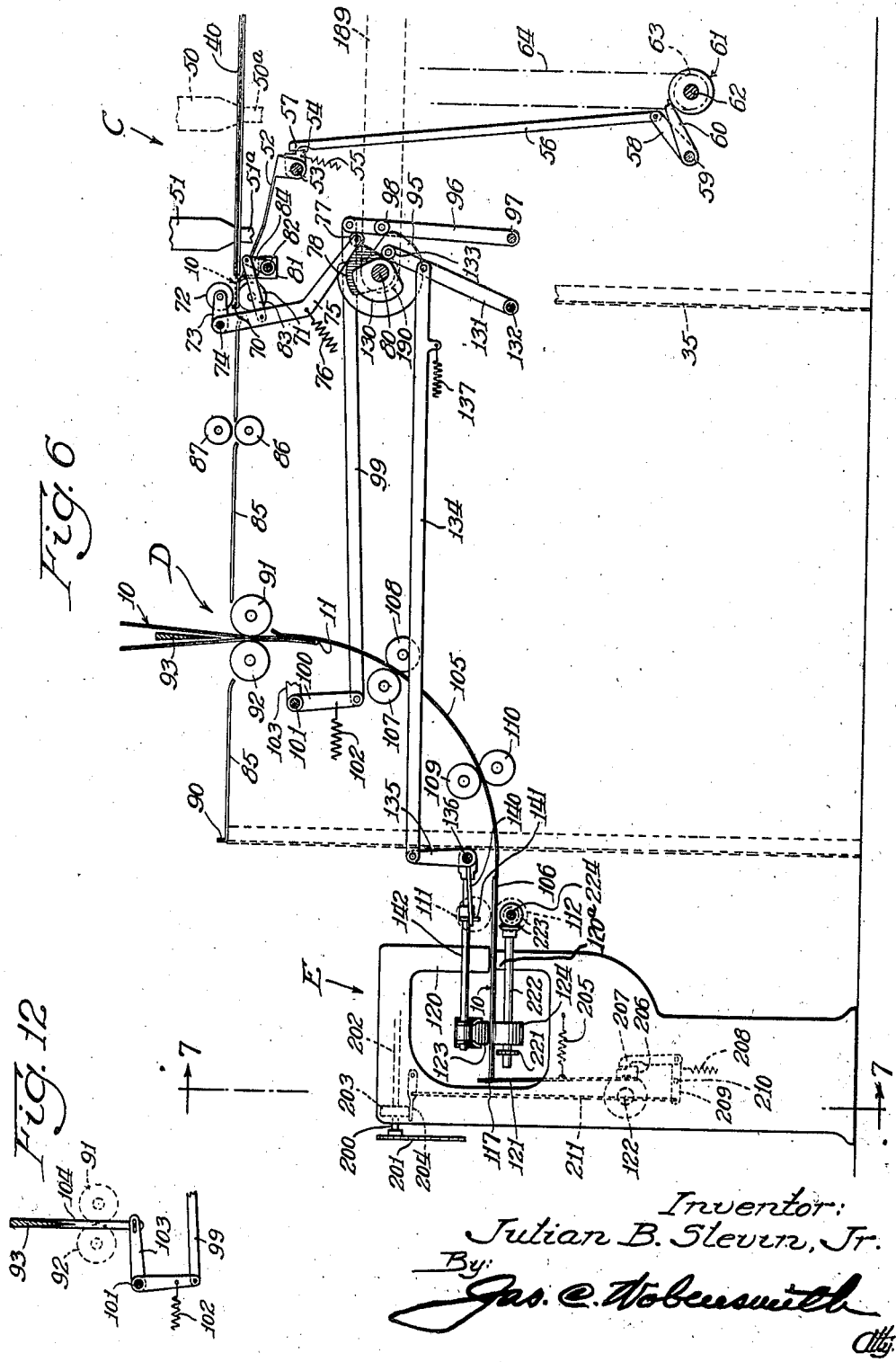

Jan. 12, 1943.    J. B. SLEVIN, JR    2,308,394
MACHINE FOR MAKING CONTAINER CARRIERS
Filed Sept. 3, 1941    5 Sheets-Sheet 4
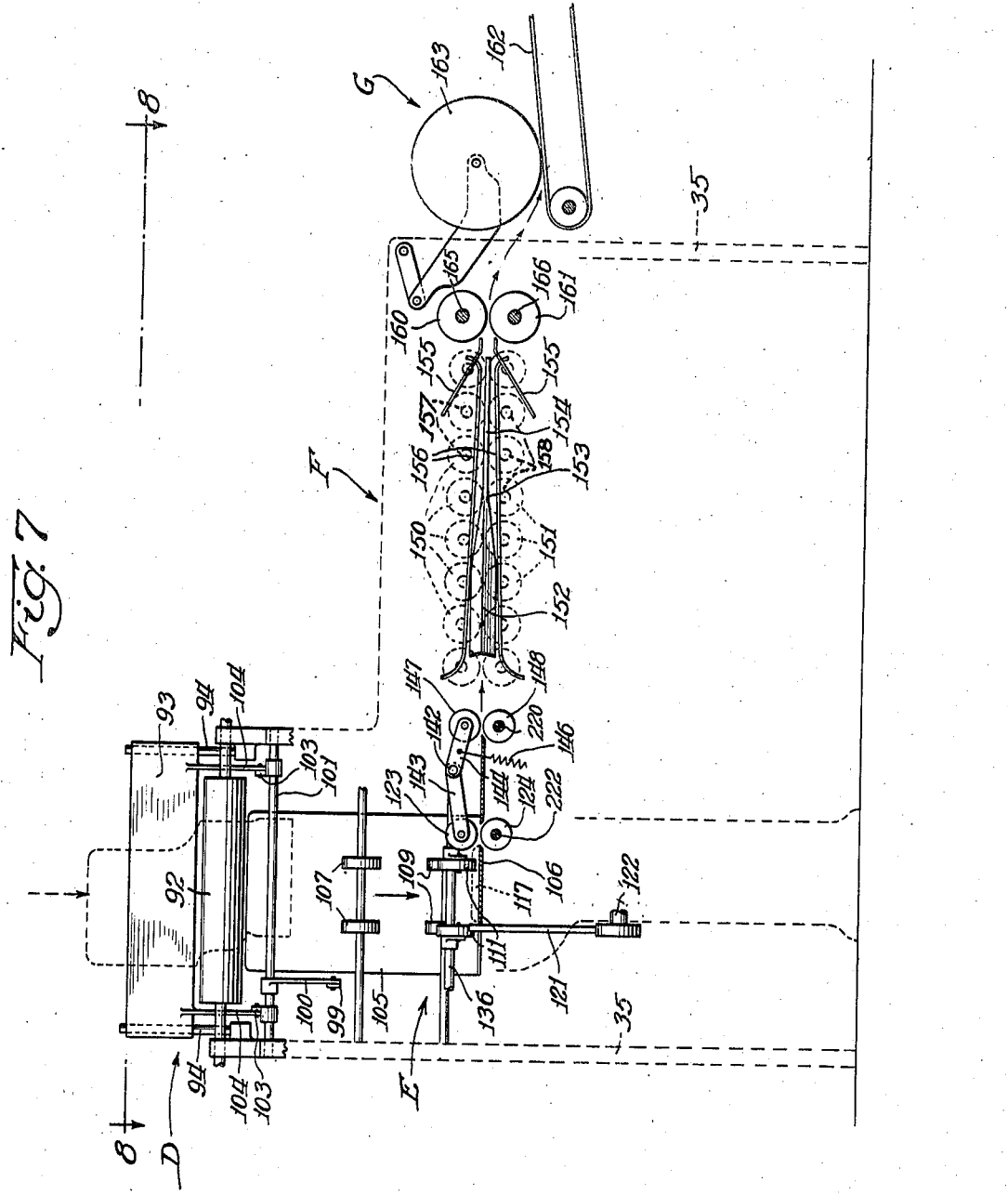

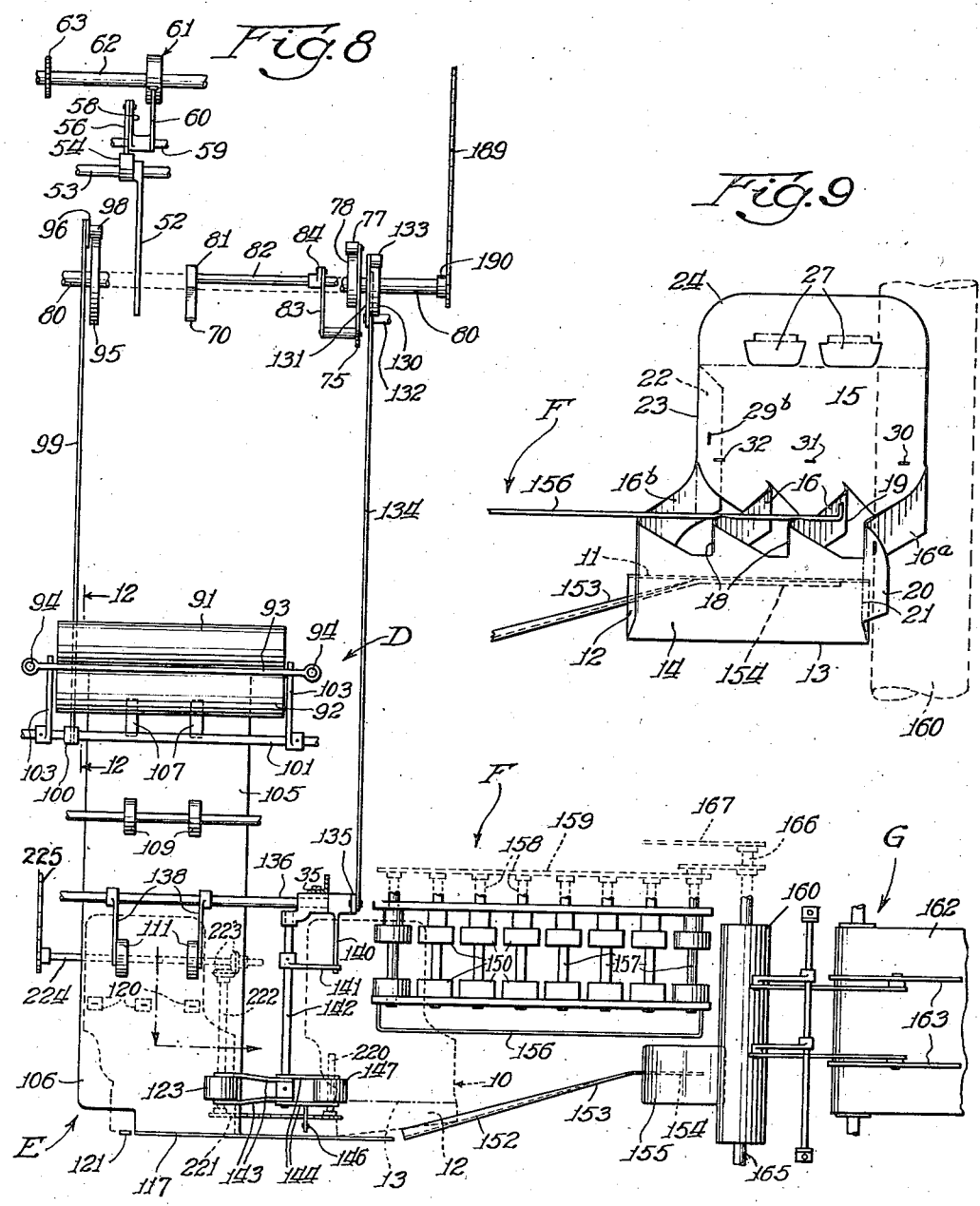

Patented Jan. 12, 1943

2,308,394

UNITED STATES PATENT OFFICE 2,308,394

MACHINE FOR MAKING CONTAINER CARRIERS

Julian B. Slevin, Jr., Drexel Hill, Pa.

Application September 3, 1941, Serial No. 409,340

18 Claims. (Cl. 93—37)

This invention relates to machines for making container carriers, and more particularly to a machine for forming and securing to each other the various parts of container carriers made from preshaped and slitted blanks of paperboard, or similar material, and of the type such as are commonly used for carrying a plurality of bottles, cans, or other containers, used for dispensing beverages and foods.

The principal object of the present invention is to provide an improved machine for making container carriers from preshaped and slitted blanks of paperboard or the like.

A further object of the present invention is to provide a machine for making container carriers ready for use in connection with bottle filling or other packaging machinery now available on the market.

A further object of the present invention is to provide a machine for making container carriers which will quickly and automatically form and secure to each other the various parts of a preshaped and slitted blank in such manner that the same may be shipped in a flattened or collapsed condition, but which are ready to be easily and expeditiously set up for use when desired.

Other objects and features of the invention will be apparent from the annexed specification and claims.

The nature and characteristic features of the invention will be more readily understood from the following description, taken in connection with the accompanying drawings forming part hereof, in which:

Figure 1 is a plan view of a preferred form of blank, shaped and slitted for the purpose of making a container carrier by means of the machine of the present invention, certain of the parts being indicated in dotted lines to indicate the first operations performed on said blank by the machine;

Fig. 2 is a similar view of the blank after additional operations have been performed thereon by the machine;

Fig. 3 is a view similar to Fig. 2 showing a carrier, in the flattened or collapsed condition as delivered from the machine and ready for packing and shipment to the user;

Fig. 4 is a perspective view of a carrier in the set-up condition, ready to receive the bottles or other containers for which it is intended;

Fig. 5 is a diagrammatic plan view of a preferred embodiment of the machine of the present invention;

Fig. 6 is a vertical sectional view of a portion of the machine taken approximately on the line 6—6 of Fig. 5;

Fig. 7 is a vertical sectional view of a portion of the machine taken approximately on the line 7—7 of Fig. 6;

Fig. 8 is a horizontal sectional view of a portion of the machine taken approximately on the line 8—8 of Fig. 7;

Fig. 9 is a fragmentary horizontal view, on a somewhat larger scale than Fig. 8, of a portion of the machine shown in Fig. 8, and illustrating the completion of the operations and the delivery of the carrier in collapsed condition;

Fig. 10 is a view in perspective of a portion of the tab folding structure illustrated in Fig. 5;

Fig. 11 is a fragmentary elevational view taken approximately on the line 11—11 of Fig. 5, and illustrating the mechanism for initiating the movement of a blank through the machine; and Fig. 12 is a fragmentary vertical sectional view taken approximately on the line 12—12 of Fig. 8, and illustrating certain details of the folder blade actuation.

It will, of course, be understood that the description and drawings herein are illustrative merely, and that various modifications and changes may be made in the structure disclosed without departing from the spirit of the invention.

The machine of the present invention is particularly adapted for forming and assembling carriers of sheet material, such as paperboard, which are adapted to hold containers and particularly bottles and the like. The carrier is preferably of a character such as that illustrated in my prior application for letters patent for improvements in Carriers for bottles and the like, filed April 24, 1940, Serial No. 331,279. The carrier is preferably formed from a single blank of sheet material, slitted and with crease lines formed thereon, to provide a bottom panel at the center of the blank, side wall panels on each side of the bottom panels, inclined strips or struts formed by inclined slits in the blank to provide combined struts and partitions connecting the side wall panels to central partition portions, with handle portions located at the extremities of the blank, there being bridging tabs provided at the lower extremities of certain of the inclined strips or struts, and on one edge of the blank, to connect the struts to the side portions and provide partial end closing elements, and bridging tabs between the upper extremities of certain of the strut portions and the portions adjacent the handle portions, and at the other edge of the blank, for bridging the ends of these strut portions.

The sheet or blank which the machine of the present invention is adapted to assemble is illustrated at 10, the sheet being substantially symmetrical about a transverse crease line 11. Rectangular panels 12 are provided on each side of the crease line 11, these panels forming the bottom of the completed carrier. Each of the bottom panels 12 has a section 14 joined thereto along a transverse crease line 13, the sections 14 being adapted to form the outer side walls of the carrier. Each of the sections 14 is joined to another and central partition section 15 by means of a plurality of inclined strips or struts 16. The sections 14 are initially offset with respect to the sections 15 as illustrated. The inclined strips 16 are formed by means of a plurality of inclined slits 17 cut in the sheet or blank 10, and there are provided longitudinal crease lines 18 where the strips 16 join the sections 14 and also longitudinal crease lines 19 where said strips 16 join the sections 15. On one side of each section 14 there is provided a bridging tab 20 joined to the inclined strip 16a which is disposed at that end of the structure and also joined to the section 14 along a longitudinal crease line 21. At the other end of each section 15 there is provided a bridging tab 22 which is joined along a longitudinal crease line 23 to the section 15, and also to the inclined strip 16b which is at that end of the structure. Each section 15 is also provided with a handle portion 24 joined thereto along a transverse crease line 25. One of the handle portions is cut out as at 26 while the other of the handle portions has the material 27 of the handhold cutout joined to the main body of the handle portion 24 along a transverse crease line 28.

The machine as illustrated herein is designed and constructed so as to perform successively on the blank 10, a number of operations, preferably in the order hereinafter stated. The bridging tabs 22 and 20 are turned and stitched to adjacent portions of the blank 10. The blank 10 is then preferably folded along the transverse crease line 11 and a further stitching operation is employed for securing the sections 15 of the folded blank to each other in superposed relationship.

While the carrier may be shipped in this condition and opened up for use, the carrier is preferably prepared in a manner such that it is ready for use with automatic bottling and other packaging machinery. This is accomplished by upsetting or infolding the bottom panels 12 along the crease lines 11 and 13, positioning the inclined strips or struts 16 so that they are bent along their crease lines 18 and 19, and offsetting the wall sections 14 with respect to the sections 15 in the opposite direction from their initial positions in the blank. The relationship of the parts of the carrier, as delivered from the machine, is such that upon the release of pressure on the side wall sections 14 the carrier will tend to assume a somewhat more expanded condition and may be readily positioned as illustrated in Fig. 4.

The carriers are preferably delivered in flat condition from the machine, as shown in Figs. 3 and 9, for packing and delivery, and are ready for use with the packaging machinery without the necessity for any further operations other than a slight opening up from the position shown in Figs. 3 and 9.

It will, of course, be understood that the carrier may be made in other forms, the carrier shown being illustrated merely by way of example.

The machine for assembling carriers of this type and similar types is shown in Figs. 5 to 12, inclusive.

The machine, as hereinafter more fully pointed out, is adapted to perform on the flat carrier blank a number of successive operations at successive stations for converting the blanks to collapsed carriers ready for shipment to the user. These operations include: (A) blank feeding, (B) tab turning, (C) tab stitching, (D) carrier blank folding, (E) carrier blank stitching, (F) bottom infolding and wall offsetting, and (G) group assembling for shipping. The mechanism at the respective stations for effecting these operations will be taken up in order.

A suitable frame 35 is provided for supporting the various portions of the structure. This frame 35 has merely been indicated and the driving motors, driving belts, chains, and the like, have been omitted in the interest of clarity.

The carrier blanks 10 are individually fed into the machine by hand, if desired, but preferably by means of a sheet feeding device of any of the well known types commonly used for such purposes, but not shown in the drawings.

Upon the introduction of the blank it is advanced through the machine with a timed step by step movement, with dwells or pauses for the performance of certain operations on the blank. The advancing is preferably accomplished by means of pairs of rollers adapted to grip the carrier blank continuously or intermittently, as required. The intermittent gripping of the carrier blank is preferably effected, as hereinafter more fully pointed out, by means of idler rollers having a cam controlled movement for compressing or clamping the carrier blank against driven or positively actuated rollers.

The mechanism for initially advancing the carrier blank supplied by the feeder is illustrated in Figs. 5 and 11 and includes lower driving rolls 180, positively actuated by a shaft 181, and upper idler rolls 182. The upper idler rolls 182 are rotatably mounted on individual spindles carried by arms 183, and the arms 183 are connected to a rocker shaft 184. A lever arm 185, also connected to the rocker shaft 184, carries a cam follower roller 186 for engagement with an advancer cam 187. A spring 179 is connected to the lever arm 185 for holding the follower roller 186 in engagement with the cam 187. The advancer cam 187 is carried by a shaft 188 and is adapted to be driven by a chain 189 from a sprocket 190 on a shaft 80 which also serves as a cam shaft, as hereinafter pointed out. The cam 187 is effective for intermittently moving the idler rolls 182 into and out of engaging position with respect to a carrier blank 10, in timed relationship, and when the rolls 182 are in engagement with the blank 10 act with the rolls 180 for advancing a carrier blank 10 for delivery to the tab turning station B.

The structure at the station B for turning the bridging tabs is illustrated in Figs. 5 and 10 and includes a central supporting plate 36 with guides at the edges thereof for engagement with the tabs. One of the tabs 20 and one of the tabs 22 are the first portions of the carrier blank 10 to be acted on upon the advancing of the blank. The tab turning guides for the bridging tabs 22 preferably include a vertical carrier blank positioning portion 38, and a curved inturning tab guide portion 39 and a horizontal tab guide portion 40, which direct the tabs 22 progressively first upwardly, and then downwardly into inturned position. A flat horizontally disposed carrier blank positioner or shoe 41, carried by the vertical portion 38, and spaced from the supporting plate 36, and from the inner face of the guide portion 40, is provided for aiding in holding the carrier blank 10 in proper alignment during the tab turning.

The tab turning guides for the bridging tabs 20 are shaped in a manner similar to the other tab guides and include a vertical blank positioning portion 42, a curved inturning tab guide portion 43 and a horizontal tab guide portion 44.

Driven rolls 45 are provided for engaging the blank 10 as the same is advanced by the rolls 181 and 182, and another set of driven rolls 46 is provided by means of which the blank 10 is fed forwardly to the tab turning device or station B hereinbefore described. After the blank 10 passes through the tab turning device it is engaged by another set of continuously driven feed rolls 47 for advancing the carrier blank to a position at station C for the stitching of the tabs.

The tab stitching mechanism at station C preferably includes wire stitching heads 50, having cooperating clinching anvils 50a spaced therebelow, for stitching the turned tabs 20 at 29a, and wire stitching heads 51, having cooperating clinching anvils 51a therebelow, for stitching the turned tabs 22 at 29b, respectively. These wire stitching heads may be of any preferred type, several being readily procurable on the market, for inserting wire stitching in the well known manner. A stitcher trigger 52 for operating the stitching heads 50 and 51 is provided for actuation by the carrier blank 10 upon the advance thereof. The stitcher trigger 52 is supported on a shaft 53 carried by the frame and has an operating abutment arm 54 actuated by the trigger 52. A spring 55 is provided for normally urging the trigger 52 to its upper position in the path of the advancing carrier blank 10. A control arm 56, having a shoulder 57, is provided against which the abutment arm 54 operates with a lost motion connection, and is pivotally connected to a lever 58, carried by a shaft 59, for operating a clutch lever 60 also carried on the shaft 59 and movable with the lever 58 for actuating a single revolution clutch 61, on a drive shaft 62. Sprockets 63 are mounted on the drive shaft 62 for intermittent operation upon engagement of the clutch 61, and stitcher driving chains 64, in engagement with the sprockets 63, are provided for operating the stitching heads 50 and 51 in unison.

The tab stitching mechanism also includes a movable stop 70 for positioning the carrier blank 10, upon the advance thereof by the rolls 47, at the proper location for stitching and for holding the carrier blank 10 from further advance during the stitching. The movable stop 70 is positioned so that the carrier blank 10 dwells in contact therewith for a sufficient time interval for stitching, as hereinafter pointed out.

A timed positive pick-up is provided for advancing the blank, upon the completion of the tab stitching operations, to the blank folder mechanism at station D. The pick-up includes driven rollers 71, the upper portions of which are in the plane of the lower face of the carrier blank 10 and movable rollers 72 for controlled intermittent movement to and from a position for causing the carrier blank 10 to engage the driven roller 71 and thus be advanced thereby. The rollers 72 are carried by arms 73. The arms 73 are fixedly mounted on a transverse shaft 74, and a lever 75 is also carried by the shaft 74. The lever 75 has a spring 76 connected thereto for normally urging the rollers 72 into engaging position. The lever 75 has a cam engaging roller 77 at the lower end thereof for engagement with a cam 78. The cam 78 is mounted on the cam shaft 80 and the cam 78, through the linkage indicated, thus controls the positioning of the rollers 72.

The movable stop 70 comprises a stop finger carried on a block 81 secured to a shaft 82, the shaft 82 being operated from the lever arm 75 by a link 83 and an arm 84. The stop finger 70 is timed in its operation so as to provide for a pause or dwell for the tab stitching and so that as the rollers 72 are moved to their engaging position the stop finger 70 is retracted to permit the advancing of the tab stitched carrier blank 10 therebeyond, in timed relationship.

The folder mechanism at station D includes a table 85 along which the carrier blank 10 is advanced by the pick-up mechanism and also by driven rollers 86 and 87. The table 85 has a stop 90 at the end thereof to which the carrier blank is advanced in preparation for folding. The folder mechanism includes a pair of continuously driven folder rolls 91 and 92 and a folder blade 93 mounted in alinement with the bight between, or adjoining peripheral contact faces of, the rolls 91 and 92. The folder rolls 91 and 92 preferably have the external surfaces thereof adapted for gripping engagement with the carrier blank and may be covered with yielding composition material for exerting the desired gripping force. The lower edge of the folder blade 93 is adapted to engage the carrier blank 10 along the crease line 11, the crease line being positioned by the engagement of the blank 10 with the stop 90. The folder blade 93 is mounted for movement on vertical guides 94 and is controlled and timed so that in its downward movement against the carrier blank 10 it will cause an initial bending of the blank 10 by pressure at the crease line 11, and will cause the blank 10 to move into the bight of the rolls 91 and 92. The gripping of the blank 10 between the rolls 91 and 92 effects a downward delivery of the carrier blank 10.

The movement of the folder blade 93 is controlled in timed relationship to the peripheral speed of the rolls 91 and 92 and the positioning of the rolls 72, by a folder blade cam 95 mounted on the cam shaft 80, so that the carrier blank 10 is engaged by the folder blade 93 at the crease line 11, folded therealong and moved downwardly to bring the carrier blank into a position for gripping by the rolls 91 and 92, and then withdrawn. A follower lever 96, pivotally mounted at 97, carries a cam follower roller 98, in engagement with the cam 95, and a link 99 is pivotally connected to the follower lever 96 and to a lever 100 secured to a rocker shaft 101. A spring 102 is connected to the lever 100, and through the link 99 and the follower lever 96 holds the follower roller 98 in engagement with the cam 95. The rocker shaft 101 also has lever arms 103 secured thereto for actuating, through sliding connections, extensions 104 on the folder blade 93.

A curved guide 105 is provided, beneath the rolls 91 and 92, for receiving the blank 10 delivered downwardly by the rolls 91 and 92 and for guiding the blank 10 from a vertical position to a horizontal position on a horizontal guide 106. Driven rollers 107, 108, 109 and 110, are provided for positive delivery of the carrier blank 10 along the curved guide 105, and rollers 111 and 112 are provided for delivery of the carrier blank 10 onto the horizontal guide 106, as hereinafter more fully pointed out. The horizontal guide 106 has a stop portion 117 for determining the position of the folded carrier blank 10 by limiting the advance of the blank 10.

The blank stitching mechanism at station E to which the folded carrier blank is thus delivered preferably includes wire stitching heads 120, operating in unison, for stitching the folded blank at 30, 31 and 32. The wire stitching heads 120 may be of any preferred type for inserting wire stitching in the well known manner and, as shown, include spaced cooperating clinching anvils 120a therebelow.

Timed operating mechanism is provided for the stitching heads 120. This mechanism includes a shaft 200 connected to a suitable motor (not shown) by means of a sprocket and a chain 201. The shaft 200 is connected to a driven shaft 202 by a clutch 203 of the single revolution type. The clutch 203 is controlled by a movable detent element 204 which when removed from a stop on the face of the clutch 203 will permit the clutch 203 to turn one revolution and then stop, the detent 204 springing back to its original position to stop the clutch 203 at the end of a single revolution. The detent 204 is positioned with respect to the clutch element 203 by means of a trip finger or stitcher control lever 121. The trip finger or stitcher control lever 121 is pivotally mounted on a rock shaft 122 for a slight rocking movement. The end of the trip finger 121 normally rests in the path of the advancing edge of the folded carrier. The trip finger 121 has a spring 205 for normally holding it in a position towards the righth and for engagement by the carrier blank, and when struck by this advancing edge is swung to the left, as seen in Fig. 6. The trip 121 has a detent 206 at the lower end thereof for lifting a latch element 207 against the tension of a spring 208. The latch element 207 is carried by a link 209, pivoted at 210, and the link 209 is connected to the detent 204 by a rod 211. Upon engagement of the latch element 207 by the detent 206 the detent 204 is removed from engagement with the clutch element 203 and the operation of the clutch is initiated. The stitching heads 121 are thus operated in unison for stitching the folded blank with opposite portions in registering relation with each other.

The horizontal guide 106 also has associated therewith a lower positively actuated roller 124, and an upper roller 123 which is adapted to be intermittently moved into engagement with the carrier blank 10, in timed relation with the folder mechanism at station D, for gripping the carrier blank between the rollers 123 and 124 and thereby removing the carrier blank 10 in a direction normal to the direction of delivery to the stitchers 120.

The mechanism for controlling the delivery of the carrier blank 10 for carrier blank stitching and the removal and delivery of the blank upon the completion of the stitching at station E includes a cam 130, carried on the cam shaft 80, and a cam follower lever 131, pivotally mounted on a shaft 132. The cam follower lever 131 has a cam follower roller 133 thereon for engagement with the face of the cam 130 and a link 134 is pivotally connected to the cam lever 131 at one end thereof and at the other end thereof to a crank lever 135 mounted on a shaft 136. The shaft 136 is preferably journaled in a suitable bearing. A spring 137, connected to the arm 134 is provided for urging the follower roller 133 into engagement with the cam 130. The shaft 136 has arms 138 secured thereto, at the ends of which the rollers 111 are mounted. The rollers 111, as heretofore indicated, when moved into engagement with the carrier blank 10, in cooperation with the rollers 112, advance the carrier blank 10 to the stop portion 117.

The shaft 136 also has a lever 140 connected thereto which engages with a lever 141, mounted on a shaft 142 which is journaled in an extension from the journal for the shaft 136. At the outer end of the shaft 142, a fork 143 is provided for movement with the shaft 142 and the fork 143 carries the roller 123 which is adapted, when moved downwardly into engagement with the carrier blank 10, to effect the engagement of the carrier blank 10 with the positively actuated roller 124, and thereby advance the carrier blank in a direction at right angles to its previous direction of movement. The shaft 142 also carries supporting arms 144 for a roller 147, the supporting arms 144 being loosely mounted on the shaft 142 and moved downwardly by a spring 146. The roller 147 is provided, above a positively actuated roller 148, so that upon downward movement of the roller 147 the blank 10 is further advanced away from station E.

The driven roller 148 is mounted on a shaft 220 which is driven by a chain 221 from a shaft 222 on which the driven roller 124 is mounted. The shaft 222 is in turn driven by bevel gears 223 from a shaft 224 on which the rollers 112 are mounted, the shaft 224 being driven by a suitable chain 225 connected to a driving motor (not shown). By the action of the rollers 123 and 124 and the rollers 147 and 148 the carrier blank 10, which has been stitched at station E, is removed and advanced for the next operation, while at the same time, another carrier blank 10 is delivered to the stitching heads 120 for stitching.

The bottom folding and wall offsetting mechanism at station F includes a plurality of alined positively actuated upper rollers 150, carried on shafts 157, and lower rollers 151, carried on shafts 158 for gripping the portions 15 and 24 of the carrier blank 10 and advancing the carrier blank 10 while rigidly restraining the same from displacement or movement out of alinement. The shafts 157 and 158 are driven by a chain 159 or other suitable positive drive. A bottom turning arm is provided which includes a diagonally extending blade portion 152 of V-shape at the end thereof, the V-portion 152 flattening toward the central part 153 thereof and the other extremity 154 of the arm being formed as a rod for further inturning of the bottom panels 12.

It will be noted that the blade portion is adapted to move the bottom panels 12, which are initially in the same plane as the remaining portions of the stitched carrier blank 10 and with an outer edge formed at the crease line 11, and fold the bottom panels 12 inwardly along the crease lines 13 with the crease line 11 inturned. Wall engaging guides 155 are provided for engagement with the sections 14 of the blank during and upon the conclusion of the inturning operation. Guide rods 156 are also provided for engagement with the outer extremities of the strip 16 (see Fig. 9). These rods 156, by bearing on the extremities of the strips 16, restrain the strips and effect a bending of the strips 16 along the crease lines 18 and 19. The wall portions 14 are thus moved from their initial positions in the blank to a position such that the sections 14 occupy a position offset from their initial position. Rollers 160 and 161 mounted on shafts 165 and 166, from which the chain 159 is also driven, are provided for receiving the carrier after the offsetting, and for delivering the same in substantially flat or collapsed condition as shown in Fig. 9 to a conveyer 162, at station G, the carriers being guided thereon by pressure discs 163. A suitable driving chain 167 is provided for driving the shafts 165 and 166. The completed carriers, in collapsed condition, may be collected from the conveyer 162 for packing in uniformly numbered groups or bunches ready for shipping to the user.

I claim:

1. A machine for making container carriers and the like from preshaped and slitted blanks of sheet material, including means for folding marginal tab portions of the blank, means for securing said marginal tab portions to adjacent portions of the blank while so folded, means for folding said blank along a substantially central transverse crease line to bring together the main body portions thereof, means for securing said main body portions to each other while the blank is so folded, means for infolding the blank adjacent the central crease line and means for moving portions of the blank to positions offset from their initial positions.

2. A machine for making container carriers and the like from preshaped and slitted blanks of sheet material, including means for folding marginal tab portions of the blank, means for stitching said marginal tab portions to adjacent portions of the blank while so folded, means for folding said blank along a substantially central transverse crease line to bring together the main body portions thereof, means for stitching said main body portions to each other while the blank is so folded, and means for infolding the blank adjacent said transverse crease line and for simultaneously moving portions of the blank to positions offset from their initial positions.

3. A machine for making container carriers and the like from preshaped and slitted blanks of paperboard or the like, including means for folding marginal tab portions of the blank, means for securing said marginal tab portions to adjacent portions of the blank while so folded, means for folding said blank along a transverse crease line to bring together the main body portions thereof, means for securing said main body portions to each other while the blank is so folded, means for infolding the blank adjacent said transverse crease line and means for folding portions of the blank along longitudinal crease lines to positions offset from their initial position in the blank.

4. A machine for making container carriers and the like from preshaped and slitted blanks of paperboard or the like, including means for folding marginal tab portions of the blank, means for securing said folded marginal tab portions to adjacent portions of the blank, means for folding said blank along a transverse crease line to bring together the main body portions thereof, means for securing said main body portions to each other while the blank is so folded, and means for folding portions of the blank along longitudinal crease lines to positions offset from their initial position in the blank.

5. A machine for making container carriers and the like from preshaped and slitted blanks of paperboard or the like, including means for folding marginal tab portions of the blank, means for securing said folded marginal tab portions to adjacent portions of the blank, means for folding said blank along a transverse crease line to bring together the main body portions thereof, means for securing said main body portions to each other while the blank is so folded, and means for infolding the blank adjacent the transverse crease line.

6. A machine for making container carriers and the like from preshaped and slitted blanks of sheet material, including means for folding marginal tab portions of the blank, means for stitching said marginal tab portions to adjacent portions of the blank while so folded, means for folding said blank along a substantially central transverse crease line to bring together the main body portions thereof, and means for stitching said main body portions to each other while the blank is so folded.

7. A machine for making container carriers and the like from preshaped and slitted blanks of sheet material, including means for folding marginal tab portions of the blank, means for securing said folded marginal tab portions to adjacent portions of the blank, means for folding said blank along a transverse crease line to bring together the main body portions thereof, and means for securing said main body portions to each other while the blank is so folded.

8. A machine for making container carriers and the like from preshaped and slitted blanks of sheet material, including means for folding marginal tab portions of the blank, means actuated by the advance of the blank for securing said folded marginal tab portions to adjacent portions of the blank, means for folding said blank along a substantially central transverse crease line to bring together the main body portions thereof, means actuated by the advance of the blank for securing said main body portions to each other while the blank is so folded, and means for advancing blanks in timed relationship to said respective folding means.

9. A machine for making container carriers from preshaped and slitted blanks of sheet material, including means for turning and securing marginal bridging tabs on the blank, means for folding the blank on a transverse crease line and superposing one portion of the blank upon another, means for securing portions of the folded blank, and means for folding portions of the blank along longitudinal crease lines to positions offset from their initial position in the blank.

10. A machine for making container carriers from preshaped and slitted blanks of paperboard or the like, including means for turning and stitching marginal bridging tabs on the blank, means for folding the blank on a central transverse crease line and superposing one portion of the blank upon another, means for stitching portions of the folded blank, and means for folding portions of the blank along crease lines to positions offset from their initial position in the blank.

11. A machine for making container carriers from preshaped and slitted blanks of paperboard or the like, including means for turning and securing marginal bridging tabs on the blank, means for folding the blank on a transverse crease line and superposing one portion of the blank upon another, means for securing portions of the folded blank, and means for folding inwardly portions of the blank bordering on said transverse crease line.

12. A machine for making container carriers from preshaped and slitted blanks of paperboard or the like, including means for turning and securing marginal bridging tabs on the blank, means for folding the blank on a central transverse crease line and superposing one portion of the blank upon another, means for securing portions of the folded blank, means for folding inwardly portions of the blank bordering on said transverse crease line, and means for folding portions of the blank along longitudinal crease lines to positions offset from their initial position in the blank.

13. In a machine for making container carriers and the like from preshaped and slitted blanks folded and secured intermediate the ends of the blank, means for turning the central portion of the blank inwardly, and means for positioning side wall portions of the blank in a flat condition at a location spaced from their initial position in the blank.

14. In a machine for making container carriers and the like from preshaped and slitted blanks folded and secured intermediate the ends of the blank, means for turning the central portion of the blank inwardly, and means for simultaneously positioning wall portions of the blank in a flat condition at a location spaced from their initial position in the blank.

15. In a machine for making container carriers and the like from preshaped and slitted blanks folded along a transverse crease line intermediate the ends of the blank, means for stitching the folded blank intermediate its ends, and means for turning the central portion of the blank inwardly along said transverse crease line.

16. In a machine for making container carriers and the like from preshaped and slitted blanks folded along a transverse crease line intermediate the ends of the blank, means for stitching the folded blank intermediate its ends, and means for positioning wall portions of the blank at a location offset from their initial position in the blank.

17. In a machine for making container carriers and the like from a preshaped and slitted blank of sheet material folded along a transverse crease line and secured at portions intermediate the ends of the blank and having bendable portions therebetween, the combination of means for inturning the portions of the blank along said transverse crease line, and means for folding portions of the blank along longitudinal crease lines thereby to position portions of the blank at locations spaced from their initial position in the blank.

18. In a machine for making container carriers and the like from a preshaped and slitted blank of sheet material folded along a transverse crease line and secured at portions intermediate the ends of the blank and having bendable portions therebetween, the combination of means for inturning the portions of the blank along said transverse crease line, and means for folding portions of the blank along other crease lines thereby to position portions of the blank at locations spaced from their initial position in the blank.

JULIAN B. SLEVIN, Jr.